United States Patent
Spilhaug

[15] 3,685,285
[45] Aug. 22, 1972

[54] SHACKLES OR CLEVISES FOR CHAINS OR THE LIKE

[72] Inventor: Tor W. Spilhaug, 3790 Helle, Norway

[22] Filed: July 7, 1970

[21] Appl. No.: 52,840

[30] Foreign Application Priority Data

July 8, 1969 Norway.....................2861/69

[52] U.S. Cl............................................59/86, 59/93
[51] Int. Cl.................................................F16g 15/04
[58] Field of Search..........59/86, 93, 85, 78; 24/116 R

[56] References Cited

UNITED STATES PATENTS

| 30,766 | 11/1860 | Sigrist | 59/93 |
| 2,614,685 | 10/1952 | Miller | 59/93 |

FOREIGN PATENTS OR APPLICATIONS 721,971 1/1955 Great Britain..................59/93

Primary Examiner—Charles W. Lanham
Assistant Examiner—Gene P. Crosby
Attorney—Watson, Cole, Grindle & Watson

[57] ABSTRACT

A shackle for interconnecting chain links comprising an essentially U-shaped member and a cross or tie member receiving the free ends of the legs of the U-shaped member the cross member having a base therein extending in a direction transversely to the direction of the legs of the U-shaped member. A cylindersegment recess in each of the legs of the U-shaped member, is also provided the axis of which recess coincides with the axis of the transverse bore in the cross member. A pin extending in tight fit in the transverse bore in the cross member is also provided in engagement with the recess in the legs of the U-shaped member.

7 Claims, 6 Drawing Figures

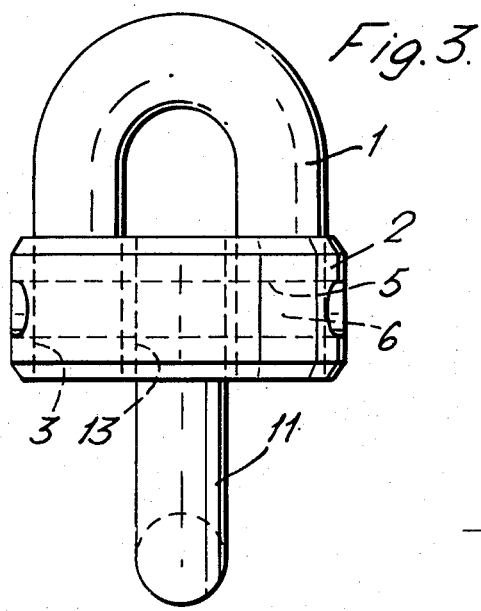
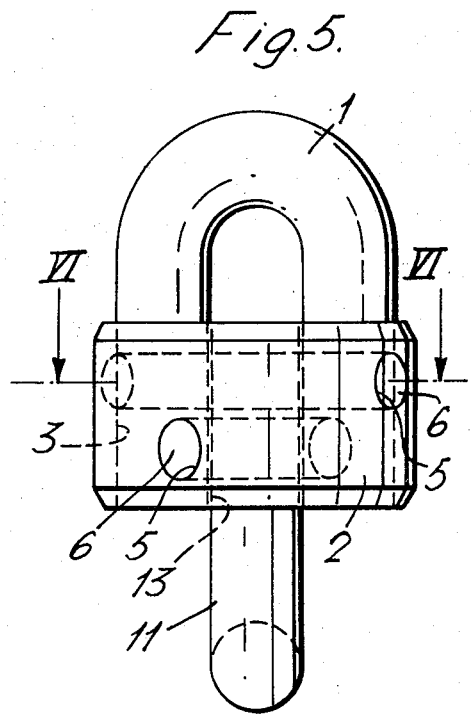
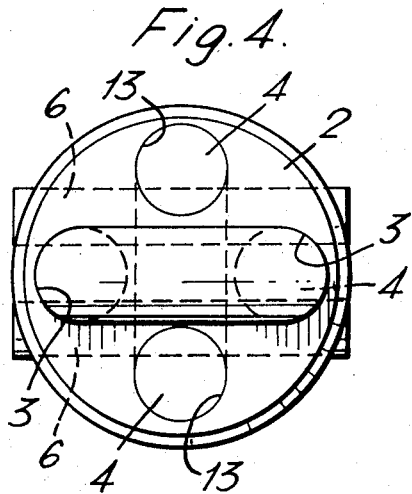
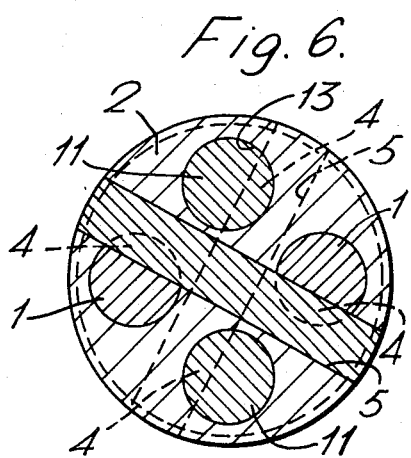

SHACKLES OR CLEVISES FOR CHAINS OR THE LIKE

The present invention relates to a shackle or clevis for chains or other connecting means, such as wire loops provided with an end eye, and the shackle is of the type comprising an essentially U-shaped member and a cross or tie member interconnecting the free ends of the U-shaped member, each leg of the U-shaped member being received in a bore in the cross or tie member.

Shackles of this type are known, wherein the free ends of the U-shaped member legs are provided with screw threads and engaging nuts, so that the shackle may be used for instance for the purpose of the tightening stays for telephone or other poles. However, in such shackles, the cross or tie member may be moved inwardly in the U-shaped member if the tension in the stay is released. An essential fact is, that the force transfer between the cross member and the U-shaped member is effected through the screw threads of the leg ends, with all the weaknesses involved in such a connection.

Further, shackles are known, in which the cross member is received in an eye in the end of each U-shaped member leg, and hereby secured by means of pins outside of the legs or by being in screw thread engagement with one of the legs. Such shackles may well be used in cases where no great requirements are put on dimensions and stresses, but they are not satisfactory in connection with such high strength chains and the like which are required in modern technic application, in particular with the vessel sizes and the low weight requirements to hoisting gears which are now more and more common. It is therefore of the greatest importance that the space available be utilized in the best possible manner, i.e., that no space consuming eyes, pins or screw bolts be required, and that the characteristics of the shackle materials be utilized in the most possible convenient manner.

According to the present invention, these purposes are fullfilled in that the cross member is also provided with at least one bore intersecting at least one of the first mentioned bores and having an axis which extends in a plane extending at right angles to a plane extending through the axes of one U-shaped member, each of the legs of each U-shaped member being provided with a cylinder segment-shaped recess the axis of which coincides with the axis of one of the last said bores, so that a pin which is received with a tight fit in one of the last said bores will tightly engage the leg recesses and thereby serve to transfer pull forces between the cross member and the U-shaped member and at the same time interlock the members. In this manner the least possible reduction of the cross sectional area of the U-shaped member legs when subjected to rectilinear draw forces is obtained, and simultaneously the cross sectional area of the pin or pins subjected to shear is the greatest possible. The U-shaped member legs will suffer from the small reduction in cross sectional area caused by the cylindersegment recesses, but the pin will be supported in the cross member along its entire length, and only subjected to shearing strains in an approximately ellipsoidally shaped shear area, i.e., in a cross sectional area which is substantially greater than that provided by a centrically supported pin.

Conveniently, each of the pin receiving bores of the cross member is so positioned that its axis is extending tangentially or substantially tangentially to the bores which receive the legs of the U-shaped member, so as to obtain the greatest possible ellipsoidically shaped shear area in each pin and the least possible reduction of the cross sectional area of the U-shaped member legs, all under due consideration of the strength characteristics of the two members in question.

Further, the shackle of the invention advantageously may be so formed that a pair of U-shaped members may be interconnected by means of one single cross or tie member, which latter is provided herein with two sets of bores, each set adapted to receive the legs of one U-shaped member with the leg planes of such members extending at right angles to each other, so that the shackle may serve as an ordinary chain link in which the incoming chain links have mutually right angled planes. Thereby, the cross or tie member may be provided with a bore adapted to receive a pin common to both sets of U-shaped member legs, so that both manufacture and use be simple, under maintenance of the good qualities, both as to draw and shear tensions.

In the accompanying drawing, examples are schematically given of how a shackle according to the invention may be brought into practice.

FIG. 3 is a view corresponding to that of FIG. 1, of a shackle comprising a pair of U-shaped members.

FIG. 4 is a view of the shackle of FIG. 3, as seen from above.

FIGS. 5 and 6 are views, corresponding to those of FIGS. 3 and 4, respectively, in a second embodiment of a shackle comprising a pair of U-shaped members.

Figure 1:
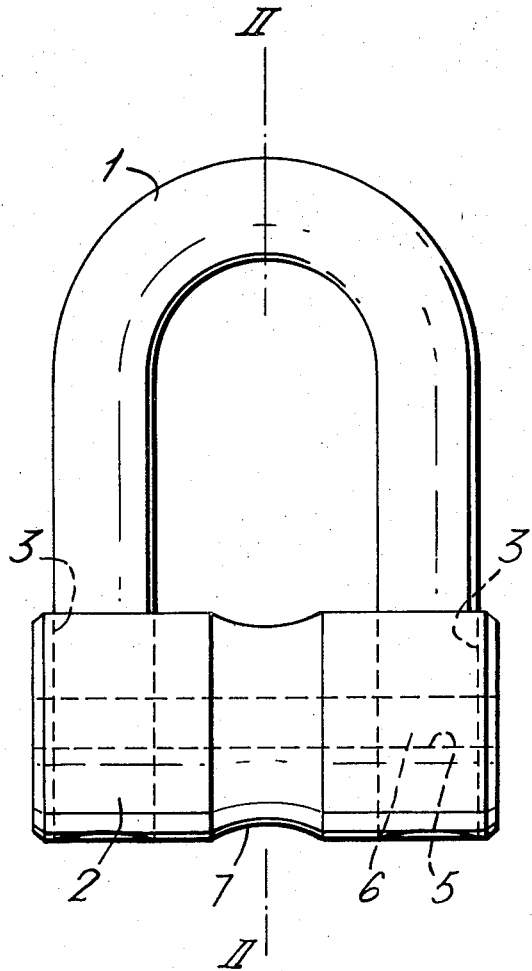
FIG. 1 illustrates a shackle according to the invention, as seen at right angles to a plane extending through the legs of the U-shaped member.
Figure 2:
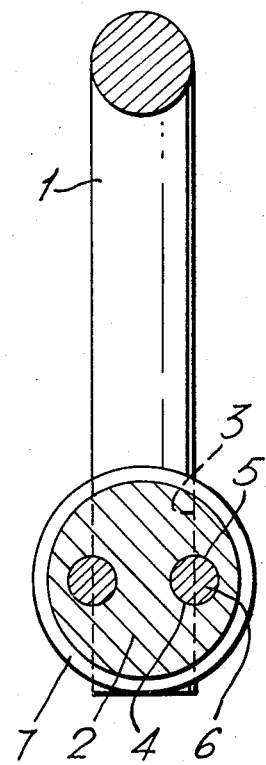
FIG. 2 is a sectional view of the shackle, taken along the line II—II of FIG. 1.

In the embodiment shown in FIGS. 1 and 2, the shackle comprises a steel rod piece 1 having a circular cross section and being curved to an essentially U-shaped form, and a circular steel member 2 provided with a pair of diametrically positioned bores 3 each adapted to receive one leg of the U-shaped member 1. Approximately at the middle of that portion of each leg which is received in the cross member 2, each such leg is provided with a cylinder segment recess 4 and the cross member 2 is provided with a pair of cross bores 5 of the same diameter and axis as those of the recesses 4, so that a pin 6 received in each of the bores 5 will interconnect the legs of the U-shaped member 1 and the cross member 2. As shown, the cross member 2 may be provided with a recess 7 which may serve to support a chain link, while the corresponding link of a second chain, which is to be connected with the first one, is received in the bend of the U-shaped member.

A shackle formed in this manner will be adapted to satisfy very high requirements as to dimensions and strength, so as to be useful in chains of extremely high strength. The stretch tension in the U-shaped member is transferred to the cross member through the pins. The cross sectional area is of the legs, it is true, somewhat reduced, but still sufficiently great to support rectilinear stretch, at the same time as the pins have their full cross sectional area and are subjected to shear tension over en approximately ellipsoidically shaped area defined by the area of contact between pin and leg recess.

In the embodiments shown in the FIGS. 3 and 4, and FIGS. 5 and 6, respectively, the shackle is made according to the same principle as that of FIGS. 1 and 2, but for the fact that each shackle comprises a pair of U-shaped members 1 and 11, respectively, and the cross member is provided with two pairs of bores 3 and 13, respectively, each pair adapted to receive the legs of one U-shaped member.

In FIGS. 3 and 4, the cross member 2 is provided with a pair of bores 5 so positioned and dimensioned as to be adapted to receive a pin 6 adapted to engage recesses 4 formed in mutually opposing faces of the U-shaped member legs. As illustrated, the axis of each pin 6 is substantially tangential to the bore 3 positioned outside of the bore 5, in order thereby to make the cross sectional area reductions of the legs of the two U-shaped members approximately equal.

In the embodiment shown in the FIGS. 5 and 6, the bores 5 of the cross member 2 are positioned in a pair of mutually parallel planes and so arranged that the axis of each of the bores 5 is extending tangentially or substantially tangentially to both bores 3 of a set of such bores, but on mutually opposing sides of the axes of such bores. Obviously, the recesses 4 of the U-shaped member legs are correspondingly displaced. In this manner, the cross sectional area reduction is the same in all U-shaped member legs, and the positioning of the bores 5 in different planes reduces the strains on the cross member 2.

I claim:

1. A shackle or clevis for use in chains or other connecting means presenting an eye, which shackle or clevis comprises at least one essentially U-shaped member and a cross or tie member interconnecting the free ends of each leg of said U-shaped member, said cross member being provided with at least one set of first bores each receiving one of said legs of said U-shaped member, characterized in that said cross member is also provided with at least one second bore intersecting at least one of said first bores and having an axis which lies in a plane extending at right angles to a plane in which the axes of said U-shaped member legs lie, each of said legs of said U-shaped member being provided with a cylinder segment-shaped recess the axis of which coincides with the axis of said second bore, and a pin member disposed within said second bore, said pin member being received with a tight fit in said second bore so as to tightly engage said leg recesses and thereby serve to transfer the pull forces between said cross member and said U-shaped member and at the same time interlock said members together.

2. A shackle as claimed in claim 1, characterized in that said axis of said second bore of said cross member extends essentially tangentially to each of said first bores.

3. A shackle as claimed in claim 1, characterized in that said cross member is provided with two sets of said first bores, two of said U-shaped members being provided and one of said two sets being adapted to receive the legs of one of said U-shaped members while the other of said two sets is adapted to receive the legs of the other of said U-shaped members, the planes of said U-shaped members extending at right angles to one another and said cross member having two of said second bores.

4. A shackle as claimed in claim 3, characterized in that the axis of each of said second bores extends tangentially to one of the bores of each said set of said first bores.

5. A shackle as claimed in claim 3, characterized in that the axes of said second bores each extend tangentially to both bores of each set of said first bores, respectively.

6. A shackle as claimed in claim 5, characterized in that the axes of said second bores each lie in mutually parallel planes.

7. A shackle as claimed in claim 6, characterized in that the axis of each of said second bores intersects a plane extending through the axes of one set of said first bores at an acute angle.

* * * * *